United States Patent [19]
Yoshioka et al.

[11] Patent Number: 5,621,021
[45] Date of Patent: Apr. 15, 1997

[54] ERASABLE WRITING INK COMPOSITION

[75] Inventors: Koji Yoshioka, Fujioka; Yasuaki Ogiwara, Tomioka; Mitsuhiko Furusawa, Gumma-ken; Kyoko Kobayashi, Fujioka, all of Japan

[73] Assignee: Mitsubishi Pencil Kabushiki Kaisha, Tokyo, Japan

[21] Appl. No.: 10,602

[22] Filed: Jan. 28, 1993

[30] Foreign Application Priority Data

Feb. 7, 1992 [JP] Japan .................................. 4-056090

[51] Int. Cl.$^6$ ..................................................... C03C 17/00
[52] U.S. Cl. .......................... 523/160; 523/161; 524/575; 106/19 A; 106/20 A
[58] Field of Search ..................... 523/160, 161; 524/575; 106/20 A, 19 A

[56] References Cited

U.S. PATENT DOCUMENTS

| | | | |
|---|---|---|---|
| 4,596,846 | 6/1986 | Bohne et al. | 524/173 |
| 4,940,628 | 7/1990 | Lin et al. | 428/207 |
| 5,062,890 | 11/1991 | Miyashita et al. | 106/27 |
| 5,120,359 | 6/1992 | Uzukawa et al. | 106/20 |
| 5,226,990 | 7/1993 | Satomi | 156/62 |
| 5,272,212 | 12/1993 | Kitahara | 525/301 |

FOREIGN PATENT DOCUMENTS

| | | |
|---|---|---|
| 0100834 | 2/1984 | European Pat. Off. . |
| 131679 | 10/1981 | Japan . |
| 57-65766 | 4/1982 | Japan . |
| 59-223769 | 12/1984 | Japan . |
| 1271470 | 10/1989 | Japan . |
| 5-41673 | 6/1993 | Japan . |
| WO89/0813473 | 9/1989 | WIPO . |

OTHER PUBLICATIONS

60–179478, Patent Abstract of Japan (1985).
57–65766, Patent Abstract of Japan (1980).
Pat. No. 58–2367 (Japan) "Ink Composition" –Abstract.
Pat. No. 58–63767 (Japan) "Ink Composition" –Abstract.
Pat. No. 1–271470 (Japan) "Erasable Ink Composition" –Abstract.
Pat. No. 58–167659 (Japan) "Ink Composition" –Abstract.
Pat. No. 59–98174 (Japan) "Ink Composition" –Abstract.
Pat. No. 59–98175 (Japan) "Ink Composition" –Abstract.
Pat. No. 59–223769 (Japan) "Ink Composition" –Abstract.
Pat. No. 59–223770 (Japan) "Ink Composition" –Abstract.
Pat. No. 60–71676 (Japan) "Ink Composition" –Abstract.
Pat. No. 60–67577 (Japan) "Ink Composition" –Abstract.
Pat. No. 61–159472 (Japan) "Ink Composition" –Abstract.
Pat. No. 1–217088 (Japan) "Ink Composition Erasable With Rubber" –Abstract.
Pat. No. 1–217089 (Japan) "Erasable Ink Composition" –Abstract.

*Primary Examiner*—Edward J. Cain
*Attorney, Agent, or Firm*—Darby & Darby, P.C.

[57] ABSTRACT

The present invention provides an erasable writing ink composition which can be erased with an eraser after writing. The erasable writing ink composition of the present invention comprises 2 to 50% by weight of a resin selected from the group consisting of styrene-butadiene rubber and an acrylonitrile-butadiene rubber having a film-forming temperature of 0° C. or less or a glass transition temperature of 0° C. or less, 0 to 5% by weight of a surface active agent, 1 to 50% by weight of colored spherical fine particles and 20 to 97% by weight of water.

11 Claims, 1 Drawing Sheet

ERASABLE WRITING INK COMPOSITION

BACKGROUND OF THE INVENTION

1. Field of the Invention

The present invention relates to an erasable writing ink composition which can be erased with an eraser after writing.

2. Description of the Related Art

As an erasable writing ink composition which can be erased with an eraser after writing, for example, Japanese Patent Application Laid-open No. 59-223769 discloses "a writing ink composition characterized by being obtained by uniformly dispersing a pigment selected from carbon black and aniline black in an aqueous ink containing dissolved polyethylene oxide in the presence of a surface active agent having a polyoxyethylene group". However, with regard to this kind of erasable writing ink composition, erasability itself is not satisfactory, and particularly after a long period of time has elapsed since the writing, erasion is difficult. Various erasable writing ink compositions other than this disclosed composition have been disclosed, but their erasability is still insufficient and a desired effect has not been attained yet.

SUMMARY OF THE INVENTION

An object of the present invention is to provide an erasable writing ink composition having excellent erasability and shelf stability which can overcome the above-mentioned drawbacks.

The present inventors have intensively researched, and as a result, they have found that when a specific resin, specific colored spherical fine particles and preferably a surface active agent are used, erasability can be remarkably improved. In consequence, the present invention has now been completed.

An erasable writing ink composition of the present invention is characterized by comprising a resin having a film-forming temperature of 0° C. or less or a glass transition temperature of 0° C. or less, colored spherical fine particles and water. Preferably, a surface active agent is additionally added to the composition. Preferably, the writing ink composition of the present invention is prepared so as to have a viscosity of 5 to 35 mPa·sec.

A sign pen of the present invention is characterized by comprising an erasable writing ink composition having a viscosity of 5 to 35 mPa·sec containing a resin selected from the group consisting styrene-butadien rubber and acrylnitrile-butadiene rubber, resinous colored spherical fine particles and water.

The resin preferably is a styrene-butadiene rubber or acrylonitrile-butadiene rubber (nitrile rubber), and the content of this resin is in the range of 2 to 50% by weight of the total weight of the writing ink composition. The colored spherical fine particles are prepared by coloring an acrylic resin or the like with a pigment or a dye, and then forming the resin into spherical particles. The content of the colored spherical fine particles in the writing ink composition is in the range of 1 to 50% by weight. The content of water therein is in the range of 20 to 97% by weight. The surface active agent can be added, 5% or less preferably from 0.01 to 4% by weight of the total weight of the writing ink composition.

Figure 1:
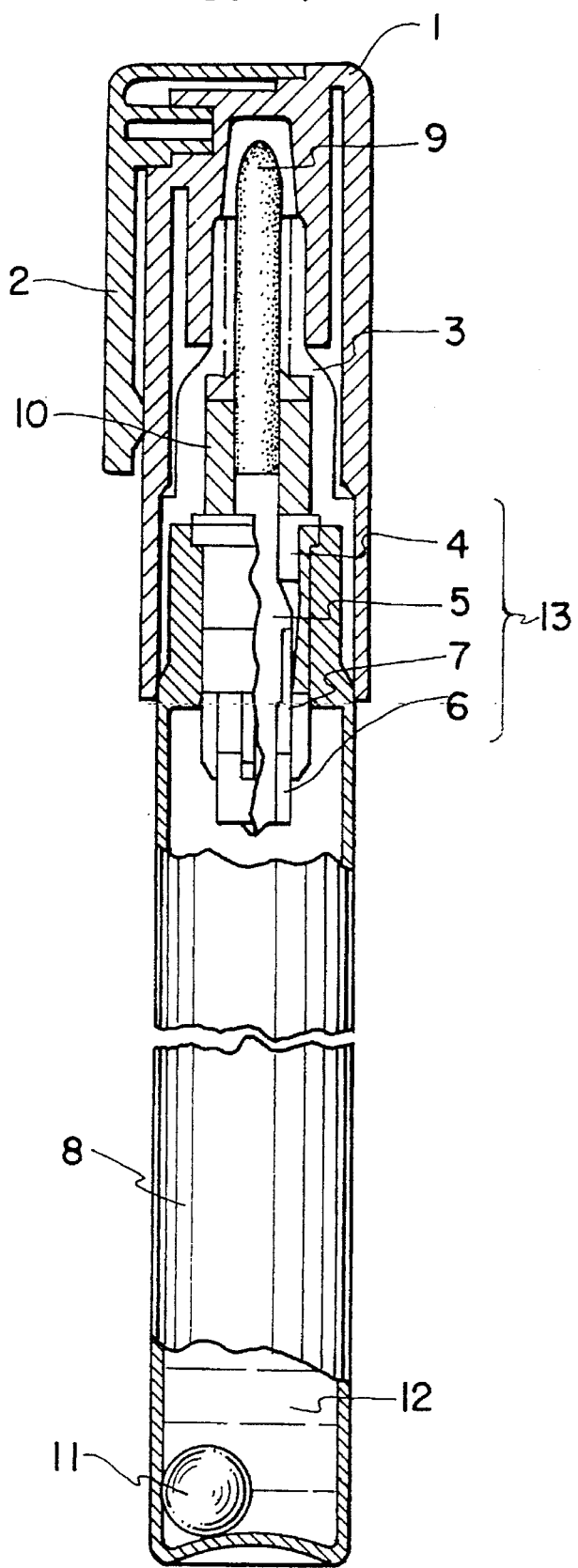
FIG. 1 shows a structure of a sign pen filled with an erasable writing medium composition.

1—Cap
2—Clip
3—Forward stem
4—Valve seat
5—Valve stem
6—Spring shoe
7—Spring
8—Main body
9—Pen core (Pen point)
10—Sponge
11—Ball (for agitation of ink)
12—Ink
13—Valve (Valve seat 4, Valve stem 5, Spring shoe 6 and Spring 7)

DETAILED DESCRIPTION OF PREFERRED EMBODIMENTS

A resin for use in an erasable writing ink composition of the present invention has a film-forming temperature of 0° C. or less or a glass transition temperature of 0° C. or less. When a resin having a film-forming temperature more than 0° C. or a glass transition temperature more than 0° C. is used, a resin film of written lines is hard and brittle, so that it is difficult to break the resin film of the written lines by rubbing them with an eraser. Even if the written lines are broken by strongly rubbing them, the resin containing a colored particle remains among fibers of a paper, and so erasability is not satisfactory. The resin is used in the range of 2 to 50% by weight, preferably 20 to 30% by weight with respect to the weight of the composition. When the amount of the resin is less than this range, the erasability is poor, and when it is too much, the resin film is too hard and the viscosity of the writing ink composition is too high to practice.

The typical resin can be selected from the following compounds, which can be used singly or in the form of a mixture of two or more thereof.

Examples of the resin include rubbery substances such as styrene-butadiene rubber, and a nitrile rubber which is a copolymer of acrylonitrile and butadiene.

Referring to the resin for the erasable writing ink composition of the present invention in more detail, preferable are resins which can be used in a state of a latex or an emulsion together with water.

Examples of the preferable resins include styrene-butadiene latex (SBR latex) and acrylonitrile-butadiene latex (NBR latex). The most preferred examples of SBR include the following products:

Trade designation, glass transition temperature and solid content by weight are ("NIPOL LX 110", −58° C., 40.5%), ("NIPOL LX 112", −58° C., 40.5%), ("NIPOL LX 119", −61° C., 50%), ("NIPOL LX 206", −24° C., 45.5%), ("NIPOL 2518 FS", −48° C., 40.5%), ("NIPOL 4850 A", −58° C., 70%) and ("NIPOL LX 432 A", −56° C., 41%) available from Nippon Zeon Co., Ltd.

Trade designation, the lowest film-forming temperature and solid content by weight are ("L-2337", <0° C., 50%) and ("L-2923", <0° C., 49%) available from Asahi Chemical Industry Co., ltd., and ("Lacstar 5215 A", <0° C., 47%), ("Lacstar DS-616", <0° C., 50%), ("Lacstar 4709 EL", <0° C., 47%) and ("Lacstar 2800 A" <0° C., 48%) available from DAINIPPON INK AND CHEMICALS, INC.

The most preferred examples of NBR include the following products:

Trade designation, glass transition temperature and solid content by weight are ("NIPOL 1551", −39° C., 51%), ("NIPOL 1561", −37° C., 41%), ("NIPOL 1571", −30° C., 40%), ("NIPOL LX 513", −55° C., 45%), ("NIPOL LX 517 A", −41° C., 40%) and ("NIPOL LX 540", −42° C., 45%) available from Nippon Zeon Co., Ltd. Trade designation, the lowest film-forming temperature and solid content by weight are ("Lacstar 4940 B", <0° C., 40%), ("Lacstar 68-073", <0° C., 43%), ("Lacstar DN-702", <0° C., 55%) and ("Lacstar DN-703", <0° C., 42%) available from Nippon Zeon Co., Ltd.

Examples of a surface active agent for use in the erasable writing ink composition of the present invention include nonionic surface active agents such as sorbitan fatty acid esters, glycerin fatty acid esters, decaglycerin fatty acid esters, polyglycerin fatty acid esters, polyoxyethylene sorbitan fatty acid esters, polyoxyethylenesorbitol fatty acid esters, polyoxyethyleneglycerin fatty acid esters, polyethylene glycol fatty acid esters, polyoxyethylene alkyl ethers, polyoxyethylenepolyoxypropylene alkyl ethers, polyoxyethylene alkylphenyl ethers, polyoxyethylene castor oils, polyoxyethlenelanolin-lanolin-alcohol-bees wax derivatives and polyoxyethylenealkylamine-fatty acid amides; and anionic surface active agents such as alkyl sulfates, polyoxyethylene alkyl ether sulfates, salts of N-acylamino acid, salts of N-acylmethyltauine, polyoxyethylene alkyl ether acetates, α-olefin sulfonates, alkyl phosphates and polyoxyethylene alkyl ether phosphates.

The content of surface active agent is 0.1–10 parts, preferably 1–5 parts by weight with respect to 100 parts by weight of colored spherical fine particles, or 0–5% by weight, preferably 0.01–4% by weight of the total weight of the writing ink composition.

Examples of colored spherical fine particles which can be used in the erasable writing ink composition of the present invention include spherical fine particles comprising a cured resin in which a pigment such as carbon black or aniline black is uniformly dispersed, spherical particles comprising spherical fine resin particles in which a pigment such as carbon black locally exists in the vicinity of the surfaces of the particles, and spherical fine particles obtained by dyeing spherical fine particles of a polymer to chemically bond a dye on the particles. The particle diameter of the spherical particles is preferably in the range of 1 to 20 μm, most preferably in range of 2 to 10 μm. If the particle diameter is too small, the colored particle gets into a paper, so that it remains therein even after erased with an eraser, which means that erasability is poor. Conversely, if the particle diameter is too large, color development is poor, so that the sharp color is not obtained.

For example, the colored spherical fine particles can be prepared by coloring an acrylic resin, acryl-urethane copolymer or benzoguanamine resin with the pigment, and then forming the colored material into spherical fine particles. The content of the colored spherical fine particles in the erasable writing ink composition is in the range of 1 to 50%, preferably 5 to 30%. If the content of the spherical fine particles is less than this range, the concentration of written lines is low, and such an erasable writing ink composition is impractical. If it is more than the above-mentioned range, the dispersion stability of the particles deteriorates, so that the erasability of the composition after writing is poor.

The dye and pigment which can be used in the colored spherical fine particles are usual pigments which can be generally used in writing ink compositions for writing. The usable pigments can be enumerated with numbers of color indexes (C.I.). Examples of the inorganic pigments include Pigment Black 6, 7, 9, 10 and 11, Pigment Red 101, 105, 106, 107 and 108, Pigment Blue 27, 28, 29 and 35, Pigment Green 17, 18, 19 and 21; and examples of the organic pigments include Pigment Black 1, Pigment Red 1, 2, 3, 4, 5, 7, 9, 12 and 22, Pigment Blue 1, 2, 15, 16 and 17, and Pigment Green 2, 7, 8 and 10. Typical examples of the pigments include titanium oxide, yellow iron oxide, red iron oxide, carbon black, Quinacridone Red, Monoazo Yellow and Phthalocyanine Blue.

The content of water is from 20 to 97% by weight, and preferably 30–75% by weight, ion-exchanged water can be used.

Anyway, a blend composition of the writing ink composition is suitably determined in consideration of the structure of a selected pen and the desired concentration of written lines.

In addition to the above-mentioned essential components, some additives which are used in usual writing ink compositions can be added to the erasable writing ink composition of the present invention, if necessary. Examples of the additives include a surface active agent, a germ-proofing agent, an organic solvent such as ethylene glycol, diethylene glycol, glycerin or propylene glycol, and the like.

It is preferred that the erasable writing ink composition of the present invention is prepared so as to have a viscosity of 5 to 35 mPa·sec.

In case the viscosity has less than 5 mPa·sec, smooth writing was obtained, when the ink composition flowed to a point. However, when the pen was covered with a cap and allowed to stand while kept upward, the colored spherical fine particles was separated from the vehicle. In consequence, when written, the vehicle only flowed out through the pen core and any lines were not written.

In case the viscosity has more than 35 mPa·sec, after the ink composition flowed to a pen point when the pen was covered with the cap and allowed to stand, the pen point was clogged, and the writing is impossible.

As the sign pen which is to be filled with the erasable writing ink composition of the present invention, such a valve type sign pen as shown in FIG. 1 is more preferable than a reservoir type sign pen.

The usage of this sign pen is as follows. (cf. FIG. 1)

(1) A point of a pen core 9 is knocked to relieve a valve mechanism 13 (which comprises a spring shoe 6, a valve stem 5, a valve seat 4 and a spring 7), so that an ink is allowed to flow to a sponge 10. In this case, the sponge 10 plays the role of an ink tank in a forward stem 3 with a pen core 9 and the sponge 10.

(2) The ink with which the sponge 10 is sufficiently impregnated reaches the pen core 9, and at this time, the sign pen is in a writable state.

(3) While writing is carried out by the point of the pen core 9, the ink is fed from the sponge 10 to give a smooth writing performance. If no sponge is present, the ink in the point of the core 9 will be used up in a short period of time.

(4) When most of the ink has been used, the point of the pen core 9 is knocked to feed the ink to the sponge 10 and the pen core 9.

The reason why the erasable writing ink composition of the present invention has the good erasability is that written lines are easily broken by an interaction between the flexibility of the resin having a film-forming temperature of 0° C. or less or a glass transition temperature of 0° C. or less and properties of the resin in the colored spherical fine particles, and thus the clean erasure of the written lines can be achieved without tearing and peeling a paper.

An erasable writing ink composition of the present invention has a low permeability to a paper and a resin in the composition has flexibility, and therefore the composition can easily break written lines. In addition, when the written lines are removed from the paper, the composition can simultaneously remove colored spherical fine particles which sink among fibers of the paper, and therefore the erasable writing ink composition can be extremely easily erased by an eraser.

EXAMPLES

Now, an erasable writing ink composition of the present invention will be described in reference to examples.

A sign pen shown in FIG. 1 was filled with each of the erasable writing ink compositions obtained in the examples and the comparative examples, and tests were then made to inspect writing properties, erasability, ink flowability, ink stability and the like.

Example 1

The following components were blended to obtain an erasable writing ink composition of the present invention.

| | |
|---|---|
| Black spherical fine particles made of Benzoguanamine resin (particle diameter = 2–5 μm) ["Epocolor BP" made by Nippon Shokubai Kagaku Kogyo Co., Ltd.] | 10 parts by weight |
| Styrene-butadiene latex ["trade name NIPOL 472" made by Nippon Zeon Co., Ltd.], (glass transition temperature = −25° C., film-forming temperature < 0° C. solid content = 50% by weight) | 40 parts by weight |
| Phosphate ester surface active agent ["N DDP" made by Nikko Chemicals Co., Ltd.] | 1 part by weight |
| Germ-proofing agent ["Proxel CRL" made by ICI Ltd.) | 0.5 part by weight |
| Water | 48.5 parts by weight |

This erasable writing ink composition was prepared by first adding the black spherical fine particles to a solution of water and the surface active agent, mixing/stirring them to form a uniform colored particle dispersion, and then adding predetermined amounts of the styrene-butadiene latex and the germ-proofing agent to the dispersion, followed by mixing/stirring. The thus obtained erasable writing ink composition had a viscosity of 27 mPa·sec.

Example 2

The following components were blended to obtain an erasable writing ink composition of the present invention.

| | |
|---|---|
| Blue spherical fine particles made of Acrylic resin (particle diameter = 2–3 μm) ["Epocolor FP-1050" made by Nippon Shokubai Kagaku Kogyo Co., Ltd.] | 10 parts by weight |
| Acrylonitrile-butadiene latex ["trade name NIPOL 540" made by Nippon Zeon Co., Ltd.], (glass transition temperature = −55° C., film-forming temperature < 0° C., solid content = 45% by weight) | 40 parts by weight |
| Polyoxyethylene octylphenyl ether ["OP-10" made by Nikko Chemicals Co., Ltd.] | 1 part by weight |
| Germ-proofing agent ["Proxel CRL" made by ICI Ltd.] | 0.5 parts by weight |
| Water | 48.5 parts by weight |

This erasable writing ink composition was prepared by first adding the blue spherical fine particles to an aqueous solution of the nonionic surface active agent [polyoxyethylene octylphenyl ether], mixing/stirring them, dispersing the particles by a dinomil to form a uniform colored particle dispersion, and then adding a predetermined amount of the acrylonitrile-butadiene latex to the dispersion, followed by mixing/stirring. The thus obtained erasable writing ink composition had a viscosity of 25 mPa·sec.

Pens were filled with these compositions obtained in the examples and writing was then carried out on papers, and in this case, good writing property was observed. Next, the written lines were erased with an eraser, and in this case, the clean erasure of the written lines can be achieved without tearing and peeling a paper.

Comparative Example 1

The following components were blended to obtain an ink composition.

| | |
|---|---|
| Black spherical fine particles made of Benzoguanamine resin (particle diameter = 2–5 μm) ["Epocolor BP" made by Nippon Shokubai Kagaku Kogyo Co., Ltd.] | 10 parts by weight |
| Styrene-butadiene latex ["trade name NIPOL 472" made by Nippon Zeon Co., Ltd.], (glass transition temperature = −25° C., solid content = 50% by weight) | 20 parts by weight |
| Phosphate-based ester surface active agent ["Nikkol DDP-8" made by Nikko Chemicals Co., Ltd.] | 1 part by weight |
| Germ-proofing agent ["Proxel CRL" made by ICI Ltd.] | 0.5 part by weight |
| Water | 68.5 parts by weight |

This ink composition was prepared by first adding the black spherical fine particles to an aqueous surface active agent solution, mixing/stirring them to form a uniform colored particle dispersion, adding predetermined amounts of the styrene-butadiene resin and the germ proofing agent to the dispersion, and then mixing/stirring them.

The thus obtained ink composition had a viscosity of 4.7 mPa·sec.

A pen was filled with this composition, and a test was carried out. As a result, smooth writing was obtained, when the composition flowed to a pen point. However, when the pen was covered with a cap and allowed to stand for one day while kept upward, the colored particle was separated from the vehicle. In consequence, when written, the vehicle only flowed out through the pen point and any lines were not written.

Comparative Example 2

The following components were blended to obtain an ink composition.

| | |
|---|---|
| Blue spherical fine particles made of Acrylic resin (particle diameter = 2–3 μm) ["Epocolor FP 1050" made by Nippon Shokubai Kagaku Kogyo Co., Ltd.] | 12.5 parts by weight |
| Acrylonitrile-butadiene latex ["trade name NIPOL 513" made by Nippon Zeon Co., Ltd.], (glass transition temperature = −55° C., solid content = 45% by weight) | 45 parts by weight |
| Polyoxyethylene surface active agent ["OP-10" made by Nikko Chemicals Co., Ltd.] | 1 part by weight |
| Germ-proofing agent ["Proxel CRL" made by ICI Ltd.] | 0.5 part by weight |
| Water | 41 parts by weight |

The thus obtained ink composition had a viscosity of 38 mPa·sec.

A pen was filled with this composition, and a test was carried out. After the pen containing the composition was allowed to stand at room temperature for one week, writing was tried. In this case, however, a pen point was clogged, and the writing was impossible.

Comparative Example 3

The following components were blended to obtain an ink composition.

| | |
|---|---|
| Black spherical fine particles made of Benzoguanamine resin (particle diameter = 2–5 μm) ["Epocolor BP" made by Nippon Shokubai Kagaku Kogyo Co., Ltd.] | 12.5 parts by weight |
| Acrylonitrile-butadiene latex ["trade name NIPOL 1577" made by Nippon Zeon Co., Ltd.], (glass transition temperature = 4° C., solid content = 38% by weight) | 45 parts by weight |
| Polyoxyethylene surface active agent ["OP-10" made by Nikko Chemicals Co., Ltd.] | 1 part by weight |
| Germ-proofing agent ["Proxel CRL" made by ICI Ltd.] | 0.5 part by weight |
| Water | 41 parts by weight |

This ink composition was prepared in the same manner as that of Example 1.

The thus obtained ink composition had a viscosity of 20 mPa·sec.

A pen was filled with this composition, and a test was carried out. As a result, smooth writing was obtained, the colored particles got into a paper, so that they remained therein even after erased with an eraser. Thus, the erasability of this composition is poor.

Comparative Example 4

The following components were blended to obtain an ink composition.

| | |
|---|---|
| Black spherical fine particles made of Benzoguanamine resin (particle diameter = 2–5 μm) ["Epocolor BP" made by Nippon Shokubai Kagaku Kogyo Co., Ltd.] | 12.5 parts by weight |
| Styrene-butadiene latex ["trade name NIPOL 2507" made by Nippon Zeon Co., Ltd.], (glass transition temperature = 52° C., solid content = 40% by weight) | 45 parts by weight |
| Polyoxyethylene surface active agent ["OP-10" made by Nikko Chemicals Co., Ltd.] | 1 part by weight |
| Germ-proofing agent ["Proxel CRL" made by ICI Ltd.] | 0.5 part by weight |
| Water | 41 parts by weight |

This ink composition was prepared in the same manner as that of Example 1.

The thus obtained ink composition had a viscosity of 25 mPa·sec.

A pen was filled with this composition, and a test was carried out. As a result, the resin film of written lines did not adhere to paper, thus erasablility was poor. The pen did not play the role of a sign pen.

Comparative Example 5

The following components were blended to obtain an ink composition.

| | |
|---|---|
| Black spherical fine particles made of Acrylic copolymer (particle diameter = 50 μm) ["Lovecolor 020" made by DAINICHISEIKA COLOR & CHEMICALS MFG. CO., Ltd.] | 12.5 parts by weight |
| Acrylonitrile-butadiene latex ["trade name NIPOL 513" made by Nippon Zeon Co., Ltd.], (glass transition temperature = −55° C., solid content = 45% by weight) | 45 parts by weight |
| Polyoxyethylene surface active agent ["OP-10" made by Nikko Chemicals Co., Ltd.] | 1 part by weight |
| Germ-proofing agent ["Proxel CRL" made by ICI Ltd.] | 0.5 part by weight |
| Water | 41 parts by weight |

This ink composition was prepared in the same manner as that of Example 1.

The thus obtained ink composition had a viscosity of 25 mPa·sec.

A pen was filled with this composition, and a test was carried out. As a result, smooth writing was obtained at the beginning of writing. However, when the pen was allowed to stand at room temperature in a while, a pen point was clogged, and the writing was impossible. A written lines had good erasability.

Comparative Example 6

The following components were blended to obtain an ink composition.

| | |
|---|---|
| Black Pigment (particle diameter = 0.025 μm) ["Carbon Black MA-8" made by MITSUBISHI KASEI CORPORATION] | 12.5 parts by weight |
| Acrylonitrile-butadiene latex ["trade name NIPOL 513" made by Nippon Zeon Co., Ltd.], (glass transition temperature = −55° C., solid content = 45% by weight) | 45 parts by weight |
| Polyoxyethylene surface active agent [OP-10" made by Nikko Chemicals Co., Ltd.) | 1 part by weight |
| Germ-proofing agent ["Proxel CRL" made by ICI Ltd.] | 0.5 part by weight |
| Water | 41 parts by weight |

This ink composition was prepared in the same manner as that of Example 1.

The thus obtained ink composition had a viscosity of 30 mPa·sec.

A pen was filled with this composition, and a test was carried out. As a result, smooth writing was obtained, and a concentration of written lines was deep. However, the colored particles got into a paper, so that they remained therein even after erased with an eraser.

What we claim is:

1. An erasable writing ink composition having a viscosity of 5 to 35 mPa·sec comprising a resin having film-forming temperature of 0° C. or less or a glass transition temperature of 0° C. or less selected from the group consisting of styrene-butadiene rubber and acrylonitrile-butadiene rubber, resinous colored spherical fine particles having a particle diameter of 1 to 20 μm, a surface active agent and water.

2. An erasable writing ink composition according to claim 1 which comprises 2 to 50% by weight of the resin, a surface active agent in an amount of up to 5% by weight, 1 to 50% by weight of resinous colored spherical fine particles and 20 to 97% by weight of water.

3. The erasable writing ink composition according to claim 2 wherein said surface active agent is at least one selected from the group consisting of nonionic surface active agents; and anionic surface active agents.

4. The erasable writing ink composition according to claim 1 wherein a resin which is used to form said resinous colored spherical fine particles is an acrylic resin, acryl-urethane copolymer or benzoguanamine resin.

5. A sign pen comprising an erasable writing ink composition having a viscosity of 5 to 35 mPa·sec containing a resin selected from the group consisting styrene-butadien rubber and acrylnitrile-butadiene rubber, resinous colored spherical fine particles and water.

6. The sign pen according to claim 5 wherein said sign pen is a valve type sign pen comprising a valve, a forward stem, pen core and sponge.

7. The erasable writing ink composition according to claim 1 wherein said resinous colored spherical fine particles are selected from the group consisting of spherical fine particles comprising a cure resin in which a pigment is uniformly dispersed, spherical fine particles comprising spherical fine resin particles in which a pigment exists in the vicinity of surfaces of particles, and spherical fine particles obtained by dyeing spherical fine particles of a polymer to chemically bond a dye on the particles.

8. An erasable writing ink composition having a viscosity of 5 to 35 mPa·sec which comprises 2 to 50% by weight of a resin having a film forming temperature of 0° C. or less selected from the group consisting of styrene-butadiene rubber and acrylonitrile-butadiene rubber, 1 to 50% by weight of resinous spherical fine particles having a particle diameter of 1 to 20 μm, 0 to 5% by weight of a surface active agent, and 20 to 97% by weight of water based upon 100% by weight of ink compositions.

9. The erasable writing ink composition according to claim 8 wherein the resin which is used to form said colored spherical fine particles is selected from the group consisting of acrylic resin, acryl-urethane copolymer, and benzoguanamine resin.

10. A sign pen comprising an erasable writing composition according to claim 1.

11. The erasable writing ink composition according to claim 3 wherein said nonionic surface active agent is selected from the group consisting of sorbitan fatty acid esters, glycerin fatty acid esters, decaglycerin fatty acid esters, polyglycerin fatty acid esters, polyoxyethylene sorbitan fatty acid esters, polyoxyethylenesorbitol fatty acid esters, poly-oxyethyleneglycerin fatty acid esters, polyethylene glycol fatty acid esters, polyoxyethylene alkyl ethers, polyoxyethylene alkylphenyl ethers, polyoxyethylene castor oils, polyoxyethlenelanolin-lanolin-alcohol-bees wax derivatives and polyoxyethylenealkylamine-fatty acid amides and said anionic surface agent is selected from the group consisting of alkyl sulfates, polyoxyethylene alkyl ether sulfates, salts of N-acylamino acid, salts of N-acylmethyltauine, polyoxyethylene alkyl ether acetates, α-olefin sulfonates, alkyl phosphates and polyoxyethylene alkyl ether phosphates.

* * * * *